Jan. 28, 1969  A. C. WICKMAN  3,424,034

EPICYCLIC CHANGE-SPEED GEARING

Filed June 16, 1967  Sheet 1 of 2

INVENTOR:-
AXEL CHARLES WICKMAN
BY Glascock, Downing & Seebold
ATTORNEY

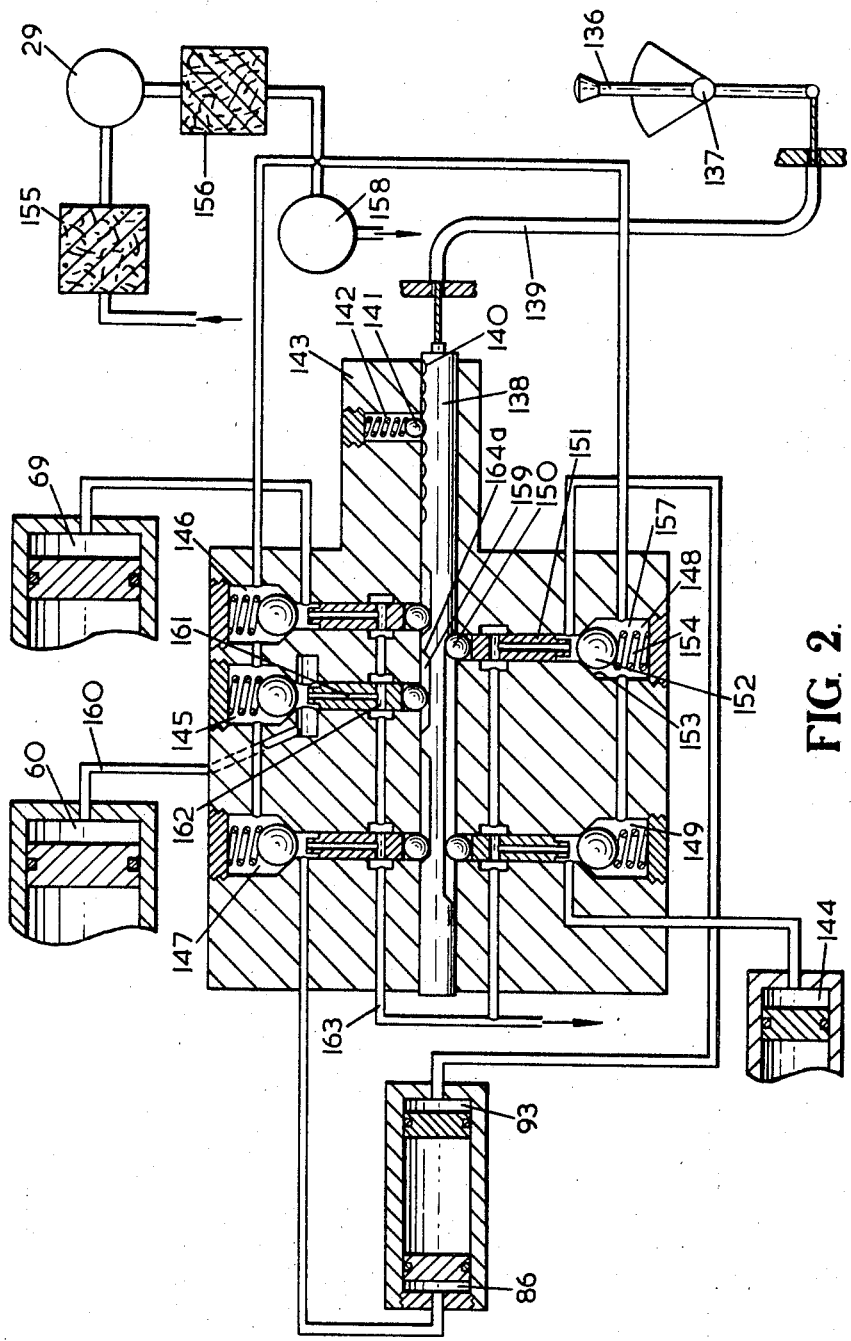

United States Patent Office 3,424,034
Patented Jan. 28, 1969

3,424,034
EPICYCLIC CHANGE-SPEED GEARING
Axel Charles Wickman, 69 S. Washington Drive,
St. Armands Key, Sarasota, Fla.
Filed June 16, 1967, Ser. No. 646,721
Claims priority, application Great Britain, July 29, 1966,
34,062/66
U.S. Cl. 74—761        10 Claims
Int. Cl. F16h 57/10

ABSTRACT OF THE DISCLOSURE

An epicyclic change-speed gearing has a power input sun gear meshing with a first planet gear set which meshes with a second planet gear set, each gear of which is coaxially connected to a gear of a third planet gear set. The planet gears are carried by a power output planet carrier. The third planet gears mesh with a reaction sun gear which is connectable to a casing for a reduction ratio or to a reaction annulus meshing with the second or third planets for direct drive. A brake band grips the reaction annulus for reverse drive.

---

Figure 1:
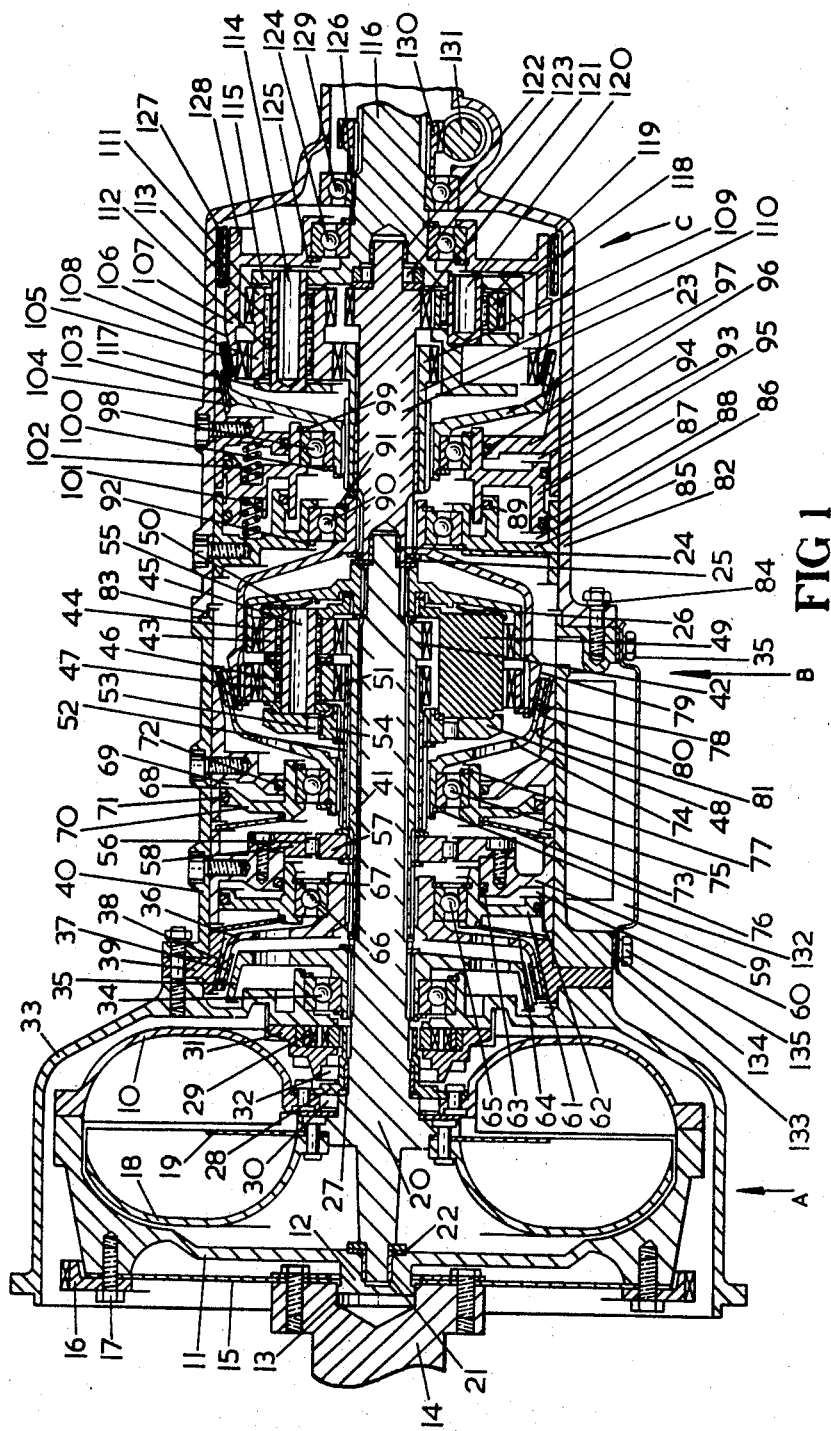

The invention concerns an improved epicyclic change-speed gearing which is particularly, but not exclusively, applicable as a change-speed gear unit or part of a change-speed gear unit for use in a motor road vehicle.

It is well-known in the art to employ epicyclic change-speed gearings to constitute a complete gear unit for a motor road vehicle, or to constitute an auxiliary two speed gearing providing optionally a planetary drive ratio or a direct drive ratio. Such auxiliary two speed gearings are commonly termed overdrive or underdrive gearings depending on whether their planetary drive ratio is respectively a multiplication or a reduction ratio.

An object of the invention is to provide an epicyclic underdrive change-speed gearing which will provide optionally a direct drive ratio, a planetary underdrive ratio, or a planetary reverse reduction drive ratio.

According to the invention an epicyclic change-speed gearing includes a power input sun gear element meshing with a first planet gear set supported from a power output planet carrier element, a second planet gear set meshing with the first planet gear set, a third planet gear set meshing with a reaction sun gear, each gear of the second planet gear set coaxial and rotatably secured to a corresponding gear of the third planet gear set, a reaction annulus gear element meshing with the second or third planet gear set, friction engaging means rotatably secured to the reaction sun gear and arranged optionally to engage either a brake surface defined by a non-rotary member whereby the power input sun gear element will transmit drive to the planet carrier element at a planetary underdrive ratio or a clutch surface rotatably fast with one of said elements whereby the power input sun gear element will transmit drive to the planet carrier element at a direct drive ratio, a brake means for optionally inhibiting rotation of the reaction annulus gear element whereby the power input sun gear element will transmit drive to the planet carrier element at a planetary reverse reduction ratio, and control means arranged to inhibit the engagement of the friction engaging means with the brake or clutch surface whilst the planet carrier is to be driven at the planetary reverse reduction ratio. Each planet gear set usually includes two or three planet gears but the word "set" is intended to include a single planet gear or more than three planet gears, if it is considered desirable.

Preferably the reaction sun gear is of greater diameter than the power input sun gear element, and each gear of the third planet gear set is of greater diameter than said corresponding gear of the second planet gear set.

According to another feature the friction engaging means may be axially-movable between a first axial position in which it engages the brake surface and a second axial position in which it engages the clutch surface, the control means is arranged to move the friction engaging means to an axial position intermediate said first and second axial positions whenever the planet carrier is to be driven at the planetary reverse reduction ratio whereby the friction engaging means will be disengaged from the brake surface and the clutch surface.

According to a further feature the control means may include a pair of opposed spring means arranged to bias the friction engaging means into its said intermediate axial position, a first force producing means is optionally operable against the action of one of said spring means to move the friction engaging means to its first axial position, and a second force producing means is optionally operable against the action of the other of said spring means to move the friction engaging means to its second axial position. Preferably at least one of said force producing means is a fluid operable piston and cylinder assembly. Furthermore the friction engaging member is preferably connected by a combined journal and thrust bearing to a double acting piston constituting said first and second force producing means.

According to yet another feature the clutch surface may be defined by the reaction annulus gear element, and the reaction annulus gear element is supported for free rotation by a combined thrust and journal bearing. This bearing will take the axial reaction of the engagement force of the clutch and should be chosen to be adequate for this purpose.

According to another feature the brake means, for optionally inhibiting rotation of the reaction annulus gear element, may be a contractile brake band anchored to a non-rotatable casing and adapted to engage a corresponding annular coaxial brake surface defined by the reaction annulus gear element.

According to a further feature a unidirectional clutch may be arranged operatively between the power input sun gear element and the power output planet carrier element such that the planet carrier will be drivingly coupled to the sun gear whenever the friction engaging means and the brake means are inoperative and the planet carrier element is driven in the forward direction. When it is desired to start the engine by pushing or towing the motor vehicle, to which the epicyclic change-speed gearing is fitted, there will be no supply of pressure fluid for operation of any of the friction engaging brake or clutch members, whereby drive could be transmitted from the power output planet carrier element to the power input sun gear element. However, the inclusion of the said unidirectional clutch enables this drive to be effected so that the engine may be started whereupon the normal supply of pressurized fluid will become available.

Furthermore, according to another feature, an epicyclic change-speed gearing may be arranged operatively in series with a further change-speed gearing which is adapted to provide a selection of forward drive ratios. Preferably the power input sun gear element is arranged to be driven by the said further gearing.

According to another feature the forward drive ratios of the said further change-speed gearing are selected such that the total number of ratios provided by the two change-speed gearings will be increased by at least two forward ratios.

An embodiment of the invention is shown by way of example in the accompanying drawings as specifically applied to a change-speed gear unit giving six forward ratios for use in a motor road vehicle, in which:

FIGURE 1 is a longitudinal vertical section through the casing, gear train and controls of the change-speed gear unit incorporating an epicyclic rear gear system, and FIGURE 2 is an illustration, in diagrammatic form only of a hydraulic control circuit.

Since the gear elements forming part of this invention are applied, in this example to an auxiliary gearing, they are described as auxiliary to distinguish them from the main epicyclic change-speed gearing.

Items which appear in both figures will be accorded the same reference numerals throughout.

Referring to the embodiment shown in FIGURE 1, A is a hydrodynamic fluid drive in the form of a fluid coupling, if desired a hydrodynamic torque converter could be used instead. B is an epicyclic gear system for providing three forward drive ratios and C is an epicyclic gear system for providing two forward and one reverse drive ratios.

The fluid coupling A has an impeller 10, and an associated front casing 11 which is supported by a spigot 12 within a bore 13 in an engine crankshaft 14. The front casing 11 is driven from the crankshaft 14 through a flexible drive plate 15 attached, with the engine starter ring gear 16, by studs and nuts 17. A driven member 18 of the fluid coupling and a baffle plate 19 are riveted to a flange formed integral with a front drive shaft 20 which is supported at its front end by the front casing 11 through a bush 21 and a thrust bearing 22. The rear of the front drive shaft 20 is supported by a centre drive shaft 23 through a bush 24 and a thrust bearing 25 adjacent to the first main annulus gear 26 of the epicyclic gear system B. The first main annulus gear 26 is supported by, and driven from the front drive shaft 20 through co-operating axially directed splines on both members. The impeller 10 is supported by the front drive shaft 20 through a bush 27 held in a sleeve member 28 attached to the impeller 10 and driving a front oil pump roto 29. The fluid coupling is sealed by an oil seal 30. The front pump rotor 29 runs in a front pump housing 31 sealed by an oil seal 32 and attached to a bell housing 33 for fastening the epicyclic change-speed gear unit to the engine.

The front drive shaft 20 is supported from the bell housing 33 by a combined journal and thrust ball race 34 and a first frusto-conical clutch member 35 which is drivingly connected to the front drive shaft 20 by axially directed co-operating splines. A first axially-movable friction engaging member 36 has friction linings 37 secured on its inner end 38 on its outer surfaces for engaging respectively with the frusto-conical clutch member 35 and a first frusto-conical brake member 39. The frusto-conical brake member 39 is fastened by studs and nuts between the bell housing 33 and a front change-speed gear casing 40. Internal axially-directed splines drivingly connect the first axially-movable friction engaging member 36 to corresponding external splines on one end of an inner sleeve 41 in a manner to support the latter whilst allowing limited axial movement of the friction engaging member 36. The other end of the inner sleeve 41 is formed with integral gear teeth to act as a first main sun gear 42. Meshing with the latter and with the first main annulus gear 26 are three circumferentially spaced first main planet gears 43 of which one is shown supported by needle roller bearings 44 on a hollow pin 45. The latter is extended forwards to carry, on needle roller bearings 46, one of three second main planet gears 47 each identical to and corresponding to the three first main planet gears 43. The pins 45 are carried by a second main planet carrier element 48 and a first main planet carrier element 49 which are fastened together by unseen screws. The pins 45 are axially located between the second main planet carrier element 48 and a plate 50 whose outer portion is rolled over into a groove formed in the outer surface of the first main planet carrier element 49, and whose inner portion is dished to act as a collector of lubricating oil which thence passes through the hollow centres of the pins 45 and radial holes to lubricate the needle roller bearings 44 and 46. Meshing with the second main planet gears 47 is a second main sun gear 51 whose teeth are formed integral with an outer sleeve 52. A rear unidirectional clutch 53 acts between an internal surface of the second main planet carrier element 48 and an inner member 54 having internal axially-directed splines to drivingly engage corresponding external splines on the outer sleeve 52. Also meshing with the second main planet gears 47 is a second main annulus member 55 at whose rear end an internally splined portion drivingly engages corresponding axially directed splines on the front end of the centre drive shaft 23.

A front unidirectional brake 56 has an inner member 57 internally splined to be driven by the external splines on the inner sleeve 41 and has an outer member 58 fastened by screws to a first partition member 59 which is fastened by screws to the front gear casing 40. Part of the first partition member is formed as a first fluid pressure operable cylinder 60 slidingly supporting a first co-acting piston 61 and sealed by O-rings 62 and 63. Axially pressing against the first piston 61 is a first frusto-conical spring 64 reacting against the first brake member 39. Force is transmitted from the non-rotating first piston 61 and first spring 64 to the first axially movable friction engaging member 36 by a combined thrust and journal ball race 65 axially located to the piston 61 by a shoulder and a snapring 66 and to the friction engaging member 36 by a shoulder and a snapring 67.

A second partition member 68 fastened by screws to the front gear casing 40 includes a second fluid pressure operable cylinder 69 coacting with a second piston 70 sealed by O-rings 71 and 72. A second frusto-conical spring 73 reacts axially between the second piston 70 and the first partition member 59. Force from the non-rotating second piston 70 and second spring 73 is transmitted to a second axially-movable friction engaging member 74 by a combined thrust and journal ball race 75 axially located to the second piston 70 by a shoulder and a snapring 76 and to the second friction engaging member 74 by a shoulder and a snapring 77. Internal splines formed in the second friction engaging member 74 drivingly engage with the external splines on the outer sleeve 52 while allowing limited axial movement to the former.

The outer portion of the second friction engaging member 74 has secured to it a frusto-conical internal friction lining 78 for engagement with a frusto-conical clutch surface portion 79 of the front annulus member 55, and a frusto-conical external friction lining 80 for engagement with a frusto-conical brake surface portion 81 of the second partition member 68.

A rear change-speed gear casing 82 is located to the front change-speed gear casing 40 by a spigot 83 and corresponding flanges held together by studs and nuts 84. Part of a third partition member 85, fastened by screws to the rear gear casing 82, forms a third fluid pressure operable cylinder 86 coacting with a third piston 87 sealed by O-rings 88 and 89. A combined thrust and journal ball race 90 supports the second main annulus 55, to which it is axially located between a shoulder and a snapring 91, from the third partition member 84, to which it is axially located between a shoulder and snapring 92. The third piston 87 also acts in a fourth fluid pressure operable cylinder 93 formed in part of a fourth partition member 94 fastened by screws to the rear gear casing 82. The third piston 87 is sealed to the fourth cylinder 93 by O-rings 95 and 96, and supports a third axially-movable friction engaging member 97 through a combined thrust and journal ball race 98 which is axially located to the third piston 87 between a shoulder and a snapring 99 and to the third friction engaging member 97 between a shoulder and a snapring 100. Three pairs of axially operating circumferentially spaced identical helically coiled compression springs of which one pair 101 and 102 are shown, serve to bias the third piston 87 to the centre of its axial travel when equal fluid pressures are applied to the third and fourth cylinders 86 and 93.

The outer portion of the third friction engaging member 97 is formed to carry an external frusto-conical friction lining 103 secured thereto for engagement with a frusto-conical brake surface 104 defining part of the fourth partition member 94, and to carry an internal frusto-conical friction lining 105 secured thereto for engagement with a frusto-conical clutch surface 106 defining part of an auxiliary annulus gear member 107 which is part of the epicyclic gear system C. When in its centre position the third piston 87 is arranged to hold the third axially-movable friction engaging member out of engagement with both the brake surface 104 and the clutch surface 106. Meshing with the teeth of the auxiliary annulus gear member 107 are three circumferentially spaced third auxiliary planet gears 108 of which one is shown, and meshing with the third planet gears 108 is an auxiliary reaction sun gear 109 whose teeth are formed integral with a rear sleeve member 110 on which external axially directed splines drivingly engage with corresponding internal splines formed in the third friction engaging member 97, whilst allowing limited axial movement to the latter.

Formed integral with each of the third auxiliary planet gears 108 but axially spaced therefrom are three second auxiliary planet gears 111, each combined planet pair rotatable on needle roller bearings 112 and 113 on a hollow pin 114 held in a planet carrier member 115 formed integral with the power output shaft 116 and help by unseen screws to a planet carrier member 117. Meshing with each of the second auxiliary planet gears 111 is a first auxiliary planet gear 118, rotatable on needle roller bearings 119 on a hollow pin 120 held by the planet carrier members 115 and 117. Also meshing with the first auxiliary planet gears 118 is an auxiliary input sun gear 121 whose teeth are formed integral with the centre drive shaft 23 which is supported by a bush 122 held in a bore in the power output shaft 116. Operable between the latter and the centre drive shaft 23 is a unidirectional clutch 123. The power output shaft 116 supports the auxiliary annulus member 107 by a combined thrust and journal ball race 124 axially located in the annulus member 107 between a shoulder and snapring 125 and in the power output shaft between a shoulder and a snapring 126. A band brake 127, lined with friction material, is operable by an unseen fluid pressure piston and cylinder 144 to contract onto a cylindrical surface 128 of the auxiliary annulus member 107. The power output shaft 116 is supported by a ball race 129 held in the rear gear casing 82 and between a shoulder on the power output shaft 116 and a first speedometer driving gear 130 driven by the power output shaft 116 and meshing with a second speedometer driving gear 131. If preferred the auxiliary annulus gear 107 could be arranged to mesh with the second auxiliary planet gears 111 instead of the third auxiliary planet gears 108.

The lower part of the front gear casing 40 is formed as a sump 132 for the lubricating and operating fluid and is closed by a plate 133 sealed by a gasket 134 and held by screws 135.

The fluid control system, whereby the various driving ratios may be engaged, will now be described with reference to FIGURE 2, which for clarity is in diagrammatic form only. Items to which reference has already been made will be indicated by the same reference numerals as in FIGURE 1.

A gear ratio selection lever 136 is arranged to move in a-single plane on a pivot 137 fast with a convenient part of the motor vehicle. The selecting lever 136 controls the position of a gear ratio selector valve 138 by means of a flexible connecting cable 139. A series of equally longitudinally spaced detent notches 140 coact with a ball 141 and spring 142, reacting against a plug screwed into a casing of the selector valve 143. Each detent notch 140, when engaged by the ball 141, serves to define the position of the selector valve 138 and selector lever 136 whereby, as the valve is moved from its right hand position to its left hand position the gear ratios will be engaged in the sequence:

Reverse
First (reduction ratio)
Second (reduction ratio)
Third (reduction ratio)
Neutral
Fourth (reduction ratio)
Fifth (direct drive ratio)
Sixth (overdrive ratio)

The supply and exhaust of operating fluid to and from each of the five fluid pressure operable cylinders 60, 69, 86, 93 and 144 is controlled by five corresponding control units 145, 146, 147, 148 and 149. Since each of the control units and the method whereby it operates the corresponding fluid cylinder is identical a detailed description will be given of only one control unit 145 and one cylinder 60. Each unit includes a ball 150 for contacting the selector valve 138, a plunger 151 movable by the ball 150 and both slidable laterally to the selector valve 138 in a bore in the selector valve casing 143. The end of the bore remote from the selector valve 138 is closed by a ball valve 152 urged against a conical seating 153 by a spring 154 reacting against a plug screwed into the selector valve casing 143.

Oil is drawn from the sump 132 by the pump 29 through a gauze filter 155 and discharged through a further gauze filter 156 to each of the chambers 157 forming part of the control units 145, 146, 147, 148, 149 and containing the spring loaded ball valve 152. A pressure relief valve 158 is set to maintain the pump outlet pressure at a suitable operating value, oil passed by the valve 158 being used to lubricate the gears and bearings.

In the positions of the selector valve 138 where oil pressure is not supplied to the fluid pressure operable cylinder 60 by its corresponding control unit 145, a flat 159 is formed on the side of the selector valve 138 to enable the ball 150 and plunger 151 to move towards the selector valve 138 and clear of the closed ball valve 152. Oil exhausting from the cylinder 60 through a passage 160 passes a portion of the plunger 151 having reduced diameter and through axial and radial drillings 161 and 162 respectively in the plunger 151 and a passage 163 to the sump. For pressurised oil to be supplied to the cylinder 60, the selector valve 138 is moved axially until a ramp 164a at one end of the flat 159 moves the ball 150 and the plunger 151 away from the selector valve 138. The plunger 151 engages the ball valve 152 which thereby closes the exhaust passage through the plunger. Further movement of the selector valve 138 causes the ball valve 152 to be displaced from its conical seating 153 so that pressurised fluid flows through the chamber 157 and the passage 106 to the fluid pressure operable cylinder 60. Raised portions of the selector valve 138 axially adjacent to the ramps serve to hold the ball valve 152 open as the selector valve is moved further. The relative disposition of the control units and the pattern of the flats on the selector valve is chosen so that when the selector valve is in the position corresponding to the engagement of each gear ratio, the necessary fluid pressure operable cylinders will be energised, as follows:

Sixth gear is selected to give an overdrive ratio. The control unit 145 is open to energise the first fluid pressure cylinder 60 to move the first axially-movable friction engaging member 36 into engagement with the frusto-conical clutch member 35 so that the planet carrier elements 48 and 49 become the driving members of the epicyclic gearing system B. The control unit 146 is open to energise the second cylinder 69 so that the second axially-movable friction engaging member 74 is engaged with the second brake surface 81, bringing to rest the friction engaging member 74 and the associated second main sun gear 51 so that the second main annulus member 55 and the associated centre drive shaft 23 are driven at an overdrive ratio. The control unit 147 is open to energise the third cylinder 86 so that the third axially-movable friction engaging member 97 is engaged with the third annulus member 107 to lock the epicyclic gear system C at unit ratio. The overall drive ratio is, therefore, an overdrive.

Fifth gear is selected to give direct drive ratio. The control unit 145 is open as above whereby the planet carrier elements 48 and 49 become the driving members of the epicyclic gearing system B. The second main sun gear 51 is prevented from rotating faster than the planet carrier elements 48 and 49 by the unidirectional clutch 53 so that the epicyclic gearing system B becomes locked at unit drive ratio. The second frusto-conical spring urges the second axially-movable friction engaging member 74 into engagement with the second main annulus member 55 to retain the epicyclic gearing system B at unit drive ratio under over-run torque conditions. The control unit 147 is open whereby the epicyclic gearing system C is at unit ratio, as described with reference to the engagement of the sixth gear ratio, so that an overall direct drive ratio is obtained.

Fourth gear is selected to give an underdrive, or reduction ratio. The unidirectional brake 56 prevents the first main sun gear 42 from reverse rotation so that the planet carrier members 48 and 49 are driven at a reduction ratio. The unidirectional clutch 53 prevents the second main sun gear 51 from reverse rotation relative to the planet carrier element 48, so that the second main annulus member 55 is driven at the same rotational speed as the planet carrier members 48 and 49. The epicyclic gear system B, therefore, operates at a reduction ratio. The control unit 147 is open, as above so that the epicyclic gear system C operates at unit drive ratio. The overall drive ratio is, therefore, a reduction ratio. The first frusto-conical spring 64 and the second frusto-conical spring 73 respectively urge the first axially-movable friction engaging member 36 into engagement with the first frusto-conical brake member 39, and the second axially-movable friction engaging member 74 into engagement with the second main annulus member 55 so that the unidirectional brake 56 and unidirectional clutch member 53 are prevented from slipping under over-run torque conditions.

Neutral drive is selected when no control units are open, so that the third and fourth cylinders 86 and 93 are not energised and the third axially-movable friction engaging member 97 is held out of engagement so that no drive is transmitted by the epicyclic gear system C.

Third gear is selected to give a greater reduction ratio than fourth gear. The control units 145 and 146 are open to that the epicyclic gear system B operates at an overdrive ratio as described above with reference to the operation of sixth gear. The control unit 148 is open to energise the fourth fluid pressure operable cylinder 93 whereby the third axially-movable friction engaging member 97 engages the third frusto-conical brake surface 104 and is brought to rest, together with the associated auxiliary reaction sun gear 109 so that the epicyclic gear system C operates at a reduction ratio. As described later, the magnitude of this reduction ratio is chosen so that the product of the overdrive ratio afforded by the epicyclic gear system B and the reduction ratio afforded by the epicyclic gear system C is arranged to be a reduction ratio greater than that obtained when fourth gear is selected.

Second gear is selected to give a greater reduction ratio than third gear. The control unit 145 is open whereby the epicyclic gear system B operates at unit drive ratio, as described with reference to the selection of fifth gear. The control unit 148 is open so that the epicyclic gear system C operates at a reduction ratio, as described with reference to the selection of third gear.

First gear is selected to give a greater reduction ratio than second gear. The epicyclic gear system B is arranged to operate at a reduction ratio, as described with reference to the selection of fourth gear. The control unit 148 is open so that the epicyclic gear system C operates at a reduction ratio, as described with reference to the selection of third gear.

Reverse gear is selected to give a reverse drive reduction ratio. The epicyclic gear system B is arranged to operate at a reduction ratio as described with reference to the selection of fourth gear. No fluid pressure is applied to the third and fourth cylinders 86 and 93 so that the third axially-movable friction engaging member 97 is held out of engagement. The control unit 149 is open so that the cylinder 144 and coacting piston are energised to contract the band brake 127 and thereby bring the auxiliary annulus member 107 to rest. The epicyclic gear system C then operates at a reverse drive reduction ratio. If it is more suitable for the vehicle to which the epicyclic change-speed gear unit is to be fitted, the epicyclic gear system B can be operated at a direct drive ratio or even an overdrive ratio instead of a reduction ratio, when reverse gear is selected.

Since, in the embodiment shown by way of example, the corresponding first and second members of the epicyclic gear system B are identical, the overdrive ratio obtained will be the inverse of the reduction ratio obtained. Preferably the reduction ratio afforded by the epicyclic gear system C is chosen to be approximately equal to the cube of the reduction ratio afforded by the epicyclic gear system B, so that the ratios of adjacent gear ratios will all be substantially equal.

In order that the engine of the motor road vehicle may be rotated when the power output shaft 116 is rotated, as when an attempted is made to start the vehicle by towing or pushing, the unidirectional clutch 123 is arranged so that the power output shaft 116 drives the centre drive shaft 23 and the associated second main annulus member 55. With no fluid operating pressure available, the epicyclic gear system B is in the underdrive ratio, so that the driven member 18 of the fluid coupling is rotated. By this means, there is no need for the inclusion of a second fluid pump to be driven from the power output shaft 116.

What I claim as my invention and desire to secure by Letters Patent of the United States is:

1. An epicyclic change-speed gearing, including a power input sun gear element, a power output planet carrier element, a first planet gear set supported by said planet carrier element and meshing with said power input sun gear element, a second planet gear set meshing with said first planet gear set, a reaction sun gear, a third planet gear set meshing with said reaction sun gear, wherein the invention comprises each gear of the second planet gear set coaxial and rotatably secured to a corresponding gear of said third planet gear set, a reaction annulus gear element meshing with one of said second and third planet gear sets, friction engaging means rotatably secured to the reaction sun gear, a non-rotary casing defining a brake surface, one of said elements defining a clutch surface, said friction engaging means optionally movable to engage one of said brake and clutch surfaces, brake means connected to said non-rotary casing, said brake means optionally engageable with said reaction gear element to inhibit rotation thereof whereby the power input sun gear element will transmit drive to the planet carrier element at a planetary reverse reduction ratio, and control means to inhibit engagement of the friction engaging means with said clutch and brake surfaces.

2. An epicyclic change-speed gearing, as in claim 1, in which the reaction sun gear is of greater diameter than the power input sun gear element, and each gear of the third planet gear set is af greater diameter than the said corresponding gear of the second planet gear set.

3. An epicyclic change-speed gearing, as in claim 1 in which the friction engaging means is axially-movable between a first axial position in which it engages the said brake surface and a second axial position in which it engages the said clutch surface, and the control means moves the friction engaging means to an axial position intermediate said first and second axial positions whenever the planet carrier is to be driven at the planetary reverse reduction ratio whereby the friction engaging means is disengaged from said brake surface and said clutch surface.

4. An epicyclic change-speed gearing, as in claim 3 in which said control means includes a pair of spring means, each spring means connected between said non-rotary casing and said friction engaging means, said spring means connected to produce forces to opposite directions on said friction engaging means whereby to bias the friction engaging means into the said intermediate axial position, first and second force producing means connected between said non-rotary casing and said friction engaging means, said first force producing means optionally operable against the action of one of said spring means to move the friction engaging means to said first axial position, and said second force producing means optionally operable against the action of the other of said spring means to move the friction engaging means to said second axial position.

5. An epicyclic change-speed gearing, as in claim 4 in which at least one of said force producing means is a fluid-operable piston and cylinder assembly.

6. An epicyclic change-speed gearing, as in claim 5 including a combined journal and thrust bearing, a double acting piston constitutes said first and second force producing means, and said combined journal and thrust bearing connects said friction engaging means to said double acting piston.

7. An epicyclic change-speed gearing, as in claim 1 in which said brake means is a contractile brake band anchored to said non-rotary casing, said reaction annulus gear element defines an annular brake surface corresponding to said brake band, and said brake band when operated grips said annular brake surface to inhibit rotation of said reaction annulus gear element.

8. An epicyclic change-speed gearing, as in claim 1 in which a unidirectional clutch is operatively connected between said power output planet carrier element and said power input sun gear element such that said power input sun gear element will be driven by said power output planet carrier element at least as fast as said power output planet carrier element in the forward direction.

9. An epicyclic change-speed gearing, as in claim 1 connected operatively in series with a further change-speed gearing having a selection of optionally engageable forward drive ratios.

10. An epicylclic change-speed gearing, as in claim 9 in which said power input sun gear element is driven by said further gearing.

References Cited

UNITED STATES PATENTS

| | | | |
|---|---|---|---|
| 2,851,907 | 9/1958 | De Normanville | 7—781 |
| 2,971,385 | 2/1961 | Miller | 74—761 X |
| 3,095,755 | 7/1963 | Duffy | 74—761 X |
| 3,182,528 | 5/1965 | Lamburn | 74—781 X |
| 3,233,478 | 2/1966 | General et al. | 74—761 |

ARTHUR T. McKEON, *Primary Examiner.*

U.S. Cl. X.R.

74—781